United States Patent
Cheng et al.

(10) Patent No.: US 9,497,466 B2
(45) Date of Patent: Nov. 15, 2016

(54) BUFFERING APPARATUS FOR BUFFERING MULTI-PARTITION VIDEO/IMAGE BITSTREAM AND RELATED METHOD THEREOF

(75) Inventors: Chia-Yun Cheng, Hsinchu (TW); Sheng-Jen Wang, Tainan (TW); Yun-Feng Tseng, Tainan (TW); Jun Cui, GuangDong (CN)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 13/304,372

(22) Filed: Nov. 24, 2011

(65) Prior Publication Data

US 2012/0185620 A1     Jul. 19, 2012

Related U.S. Application Data

(60) Provisional application No. 61/433,272, filed on Jan. 17, 2011.

(51) Int. Cl.

| | |
|---|---|
| *G06F 3/00* | (2006.01) |
| *H04N 19/129* | (2014.01) |
| *H04N 19/176* | (2014.01) |
| *H04N 19/174* | (2014.01) |
| *H04N 19/44* | (2014.01) |
| *H04N 19/423* | (2014.01) |
| *H04N 19/436* | (2014.01) |
| *G06F 13/38* | (2006.01) |
| *H04L 12/861* | (2013.01) |
| *G06F 5/10* | (2006.01) |

(52) U.S. Cl.
CPC .......... *H04N 19/129* (2014.11); *H04N 19/174* (2014.11); *H04N 19/176* (2014.11); *H04N 19/423* (2014.11); *H04N 19/436* (2014.11); *H04N 19/44* (2014.11); *G06F 5/10* (2013.01); *G06F 13/385* (2013.01); *H04L 49/90* (2013.01)

(58) Field of Classification Search
None
See application file for complete search history.

(56) References Cited

U.S. PATENT DOCUMENTS

| 5,504,823 A | 4/1996 | Yoon | |
|---|---|---|---|
| 5,802,052 A * | 9/1998 | Venkataraman | .... H04L 12/5601 370/395.72 |

(Continued)

FOREIGN PATENT DOCUMENTS

| CN | 1798236 A | 7/2006 |
|---|---|---|
| CN | 1881445 A | 12/2006 |

(Continued)

OTHER PUBLICATIONS

"International Search Report" mailed on Feb. 28, 2013 for International application No. PCT/CN2012/085145, International filing date: Nov. 23, 2012.

(Continued)

*Primary Examiner* — Henry Tsai
*Assistant Examiner* — Aurangzeb Hassan
(74) *Attorney, Agent, or Firm* — Winston Hsu; Scott Margo

(57) ABSTRACT

An exemplary buffering apparatus for buffering a multi-partition video/image bitstream which transmits a plurality of compressed frames each having a plurality of partitions includes a first bitstream buffer and a second bitstream buffer. The first bitstream buffer is arranged to buffer data of a first partition of the partitions of a specific compressed frame. The second bitstream buffer is arranged to buffer data of a second partition of the partitions of the specific compressed frame.

12 Claims, 7 Drawing Sheets

(56) References Cited

U.S. PATENT DOCUMENTS

| | | | |
|---|---|---|---|
| 6,320,909 B1 | 11/2001 | Takabatake | |
| 6,538,583 B1 | 3/2003 | Hallmark | |
| 6,625,740 B1* | 9/2003 | Datar | G06F 9/30181 713/300 |
| 6,741,256 B2* | 5/2004 | Emberling | 345/540 |
| 7,298,297 B1* | 11/2007 | Li | H03M 7/40 341/50 |
| 7,583,851 B2 | 9/2009 | Kudo | |
| 7,746,401 B2* | 6/2010 | Wu et al. | 348/333.01 |
| 7,813,431 B2 | 10/2010 | MacInnis | |
| 8,300,699 B2* | 10/2012 | Stivers et al. | 375/240.21 |
| 2002/0085424 A1* | 7/2002 | Trivedi et al. | 365/185.21 |
| 2003/0112758 A1* | 6/2003 | Pang | G06F 15/7842 370/235 |
| 2003/0126226 A1* | 7/2003 | Ramey | 709/215 |
| 2003/0155944 A1* | 8/2003 | Verdoorn et al. | 326/38 |
| 2004/0066852 A1 | 4/2004 | MacInnis | |
| 2004/0143380 A1 | 7/2004 | Stam | |
| 2004/0189623 A1* | 9/2004 | Dunn et al. | 345/204 |
| 2005/0053290 A1 | 3/2005 | Wada | |
| 2005/0175250 A1 | 8/2005 | Watanabe | |
| 2005/0276325 A1* | 12/2005 | Sato | 375/240.03 |
| 2006/0140498 A1* | 6/2006 | Kudo et al. | 382/254 |
| 2007/0070830 A1 | 3/2007 | Weng | |
| 2007/0088829 A1* | 4/2007 | Shima et al. | 709/226 |
| 2007/0133674 A1 | 6/2007 | Garnier | |
| 2008/0049240 A1 | 2/2008 | Yamamoto | |
| 2008/0240234 A1 | 10/2008 | Hung | |
| 2009/0002379 A1 | 1/2009 | Baeza | |
| 2009/0003446 A1 | 1/2009 | Wu | |
| 2009/0003447 A1 | 1/2009 | Christoffersen | |
| 2009/0217004 A1 | 8/2009 | Van De Waerdt | |
| 2009/0224950 A1 | 9/2009 | Xu | |
| 2010/0021142 A1 | 1/2010 | Minami | |
| 2010/0061455 A1* | 3/2010 | Xu et al. | 375/240.13 |
| 2010/0061461 A1* | 3/2010 | Bankoski et al. | 375/240.16 |
| 2010/0061645 A1* | 3/2010 | Wilkins et al. | 382/238 |
| 2010/0134330 A1 | 6/2010 | Sakaguchi | |
| 2010/0226441 A1 | 9/2010 | Tung | |
| 2010/0265260 A1 | 10/2010 | Swic | |
| 2010/0284456 A1 | 11/2010 | Frank | |
| 2011/0164685 A1 | 7/2011 | Zhang | |
| 2011/0216834 A1 | 9/2011 | Zhou | |
| 2012/0294366 A1* | 11/2012 | Eliyahu | 375/240.16 |
| 2013/0328896 A1 | 12/2013 | Belanger | |

FOREIGN PATENT DOCUMENTS

| | | |
|---|---|---|
| CN | 1984329 A | 6/2007 |
| CN | 101057224 A | 10/2007 |
| CN | 101087410 A | 12/2007 |
| CN | 101137052 A | 3/2008 |
| CN | 101448061 A | 6/2009 |
| CN | 101543082 A | 9/2009 |
| EP | 1 478 186 A2 | 11/2004 |
| TW | 200913723 | 3/2009 |
| TW | 200931983 | 7/2009 |

OTHER PUBLICATIONS

"International Search Report" mailed on Dec. 20, 2012 for International application No. PCT/CN2012/081288, International filing date: Sep. 12, 2012.

Peter Pirsch et al., "VLSI Implementations of Image and Video Multimedia Processing Systems", IEEE Transactions on Circuits and Systems for Video Technology, Nov. 1, 1998, pp. 878-891, XP011014520, vol. 8. No. 7, IEEE, NJ, US.

Jim Bankoski et al., "Technical Overview of VP8, an Open Source Video CODEC for the Web", Jul. 11, 2011, XP031964900, IEEE, CA, USA.

Jason Garrett-Glaser, Diary of an x264 Developer, The first in-depth technical analysis of VP8, May 19, 2010, XP055133960, URL:http://x264dev.multimedia.cx/archives/377.

Marpe et al., "Context-Based Adaptive Binary Arithmetic Coding in the H.264/AVC Video Compression Standard", IEEE Trans. on Circuits and Systems for Video Technology, Jul. 2003, vol. 13, No. 7, p. 620-636.

Chia-Yun Cheng et al., Title: Apparatus and Method for Buffering Context Arrays Referenced for Performing Entropy Decoding Upon Multi-Tile Encoded Picture and Related Entropy Decoder, pending U.S. Appl. No. 14/343,388, filed Mar. 7, 2014.

Gordon Clare et al., Picture Raster Scan Decoding in the presence of multiple tiles, Joint Collaborative Team on Video Coding (JCT-VC) of ITU-T SG 16 WP 3 and ISO/IEC JTC 1/SC 29/WG 11 9th Meeting, Apr. 27-May 7, 2012, pp. 1-5, Document: JCTVC-I0158, XP030111921, Geneva, CH.

Chih-Wei Hsu et al., AHG4: Low latency CABAC initialization for dependent tiles, Joint Collaborative Team on Video Coding (JCT-VC) of ITU-T SG16 WP3 and ISO/IEC JTC1/SC29/WG11 7th Meeting, Nov. 21-30, 2011, pp. 1-8, Document: JCTVC-G197, XP030110181, Geneva, CH.

Kiran Misra et al., Tiles, Joint Collaborative Team on Video Coding (JCT-VC) of ITU-T SG16 WP3 and ISO/IEC JTC1/SC29/WG11 5th Meeting, Mar. 16-23, 2011, pp. 1-4, Document: JCTVC-E412, XP030008918, Geneva, CH.

Gordon Clare et al., Wavefront Parallel Processing for HEVC Encoding and Decoding, Joint Collaborative Team on Video Coding (JCT-VC) of ITU-T SG16 WP3 and ISO/IEC JTC1/SC29/WG11 6th Meeting, Jul. 14-22, 2011, pp. 1-16, Document: JCTVC-F274, XP030009297, Torino, IT.

Stephan Wenger et al., "FMO 101", Joint Video Team (JVT) of ISO/IEC MPEG & ITU-T VCEG (ISO/IEC JTC1/SC29/WG11 and ITU-T SG16 Q.6), 4th Meeting: Klagenfurt, Austria, Jul. 22-26, 2002, pp. 1-11, JVT-D063, XP030005337.

Olivier Cantineau et al., "Architecture of a Memory Manager for an MPEG-2 Video Decoding Circuit", 1998, pp. 251-265, Journal of VLSI Signal Processing 20, 1998 Kluwer Academic Publishers. Manufactured in the Netherlands, XP000788432.

* cited by examiner

| | |
|---|---|
| MB_0 | Partition_1 |
| MB_1 | Partition_2 |
| MB_2 | Partition_3 |
| MB_3 | Partition_4 |
| MB_4 | Partition_1 |
| MB_5 | Partition_2 |
| MB_6 | Partition_3 |
| MB_7 | Partition_4 |
| MB_8 | Partition_1 |
| MB_9 | Partition_2 |
| MB_10 | Partition_3 |
| MB_11 | Partition_4 |
| MB_12 | Partition_1 |
| MB_13 | Partition_2 |
| MB_14 | Partition_3 |
| MB_15 | Partition_4 |

BUFFERING APPARATUS FOR BUFFERING MULTI-PARTITION VIDEO/IMAGE BITSTREAM AND RELATED METHOD THEREOF

CROSS REFERENCE TO RELATED APPLICATIONS

This application claims the benefit of U.S. provisional application No. 61/433,272, filed on Jan. 17, 2011 and incorporated herein by reference.

BACKGROUND

The disclosed embodiments of the present invention relate to video/image processing, and more particularly, to a buffering apparatus for buffering a multi-partition video/image bitstream and related method thereof.

VP8 is an open video compression format released by Google®. Like many modern video compression schemes, VP8 is based on decomposition of frames into square subblocks of pixels, prediction of such subblocks using previously constructed blocks, and adjustment of such predictions (as well as synthesis of unpredicted blocks) using a discrete cosine transform (DCT). In one special case, however, VP8 uses a Walsh-Hadamard transform (WHT) instead of the commonly used DCT.

WebP is an image format developed by Google® according to VP8. Specifically, WebP is based on VP8's intra-frame coding and uses a container based on resource interchange file format (RIFF). Besides, WebP is announced to be a new open standard that provides lossy compression for photographic images. In a large scale study of 900,000 web images, WebP images are found 39.8% smaller than joint Photographic Experts Group (JPEG) images of similar quality. Webmasters, web developers and browser developers therefore can use the WebP format to create smaller, better looking images that can help to improve user's web surfing.

In accordance with the VP8/WebP specification, the input to a VP8/WebP decoder is a sequence of compressed frames whose order matches their order in time. Besides, every compressed frame has multiple partitions included therein. As the VP8/WebP bitstream is configured to transmit compressed frames each having a plurality of partitions included therein, how to efficiently buffer and decode each compressed frame of a multi-partition VP8/WebP bitstream becomes an important issue in this technical field.

SUMMARY

In accordance with exemplary embodiments of the present invention, a buffering apparatus for buffering a multi-partition video/image bitstream and related method thereof are proposed to solve the above-mentioned problem.

According to a first aspect of the present invention, a buffering apparatus for buffering a multi-partition video/image bitstream is disclosed. The multi-partition video/image bitstream transmits a plurality of compressed frames each having a plurality of partitions. The buffering apparatus includes a first bitstream buffer and a second bitstream buffer. The first bitstream buffer is arranged to buffer data of a first partition of the partitions of a specific compressed frame. The second bitstream buffer is arranged to buffer data of a second partition of the partitions of the specific compressed frame.

According to a second aspect of the present invention, a method for buffering a multi-partition video/image bitstream is disclosed. The multi-partition video/image bitstream transmits a plurality of compressed frames each having a plurality of partitions. The method includes: utilizing a first bitstream buffer to buffer data of a first partition of the partitions of a specific compressed frame; and utilizing a second bitstream buffer to buffer data of a second partition of the partitions of the specific compressed frame.

According to a third aspect of the present invention, a buffering apparatus for buffering a multi-partition video/image bitstream is disclosed. The multi-partition video/image bitstream transmits a plurality of compressed frames each having a plurality of partitions. The buffering apparatus includes a bitstream buffer and a prefetch circuit. The bitstream buffer is arranged to buffer data of the partitions of a specific compressed frame. The prefetch circuit includes a storage unit and a prefetch unit. The prefetch unit is arranged to prefetch data of a first partition of the partitions of the specific compressed frame from the bitstream buffer and store the prefetched data into the storage unit while a decoding apparatus is decoding a second partition of the partitions of the specific compressed frame, wherein the prefetched data stored in the prefetch unit is read by the decoding apparatus when the decoding apparatus starts decoding the second partition.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

In accordance with the VP8/WebP specification, the input to a VP8/WebP decoder is a sequence of compressed frames each having 2-9 partitions. These partitions begin and end on byte boundaries. The leading partition of a compressed frame (i.e., the partition that is transmitted first) has two subsections: header information that applies to the compressed frame as a whole and per-macroblock prediction information that includes prediction information of each macroblock in the compressed frame. The remaining partitions (1, 2, 4 or 8) contain transform coefficients (e.g., DCT/WHT coefficients) of the residue signal.

Figure 1:
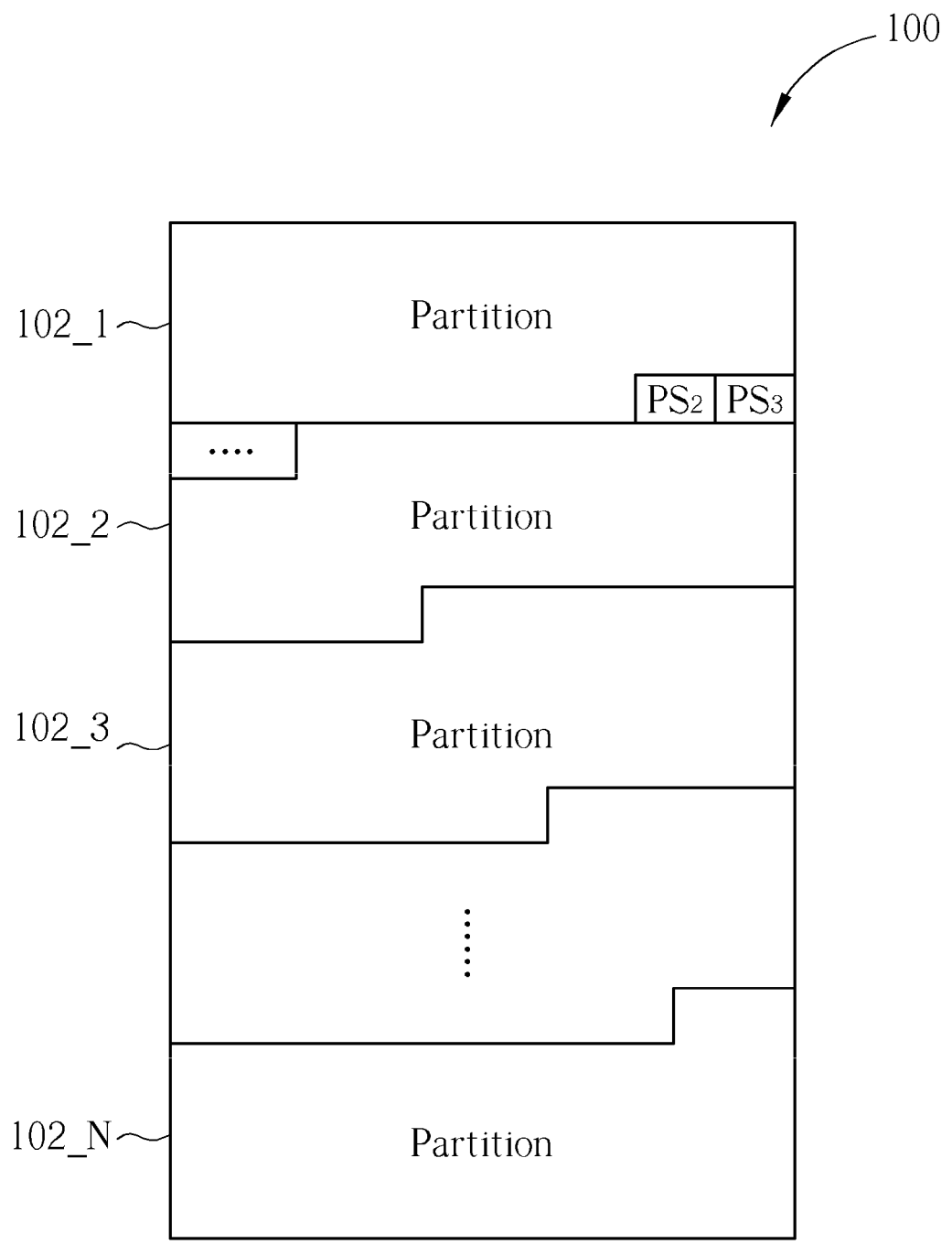
FIG. 1 is a diagram illustrating multiple partitions in a compressed frame to be processed by a proposed buffering apparatus of the present invention.

Please refer to FIG. 1, which is a diagram illustrating multiple partitions in a compressed frame to be processed by a proposed buffering apparatus of the present invention. The compressed frame 100 is transmitted via a VP8/WebP bitstream, and therefore contains N partitions 102_1-102_N which are sequentially transmitted. That is, the partition 102_1 is the leading partition of the compressed frame 100, and the partition 102_N is the last partition of the compressed frame 100. The partition 102_1 includes header information applied to the whole frame 100, and also includes the prediction information for each MB in the same frame 100. Regarding each of the remaining partitions 102_2-102_N following the partition 102_1, it includes transforming coefficients of the residue, such as DCT coefficients or WHT coefficients. When there is more than one partition for the transform coefficients, the sizes of the partitions—except the last partition—in bytes are also present in the bitstream right after the above-mentioned leading partition 102_1. Each of the partition sizes is recorded by a 3-byte data item. For example, a 3-byte partition size $PS_2$ shown in FIG. 1 indicates the size of the partition 102_2, and a 3-byte partition size $PS_3$ shown in FIG. 1 indicates the size of the partition 102_3. These partition sizes provide the decoding apparatus direct access to all DCT/WHT coefficient partitions, which may enable parallel processing of the coefficients in a decoding apparatus.

Figure 2:
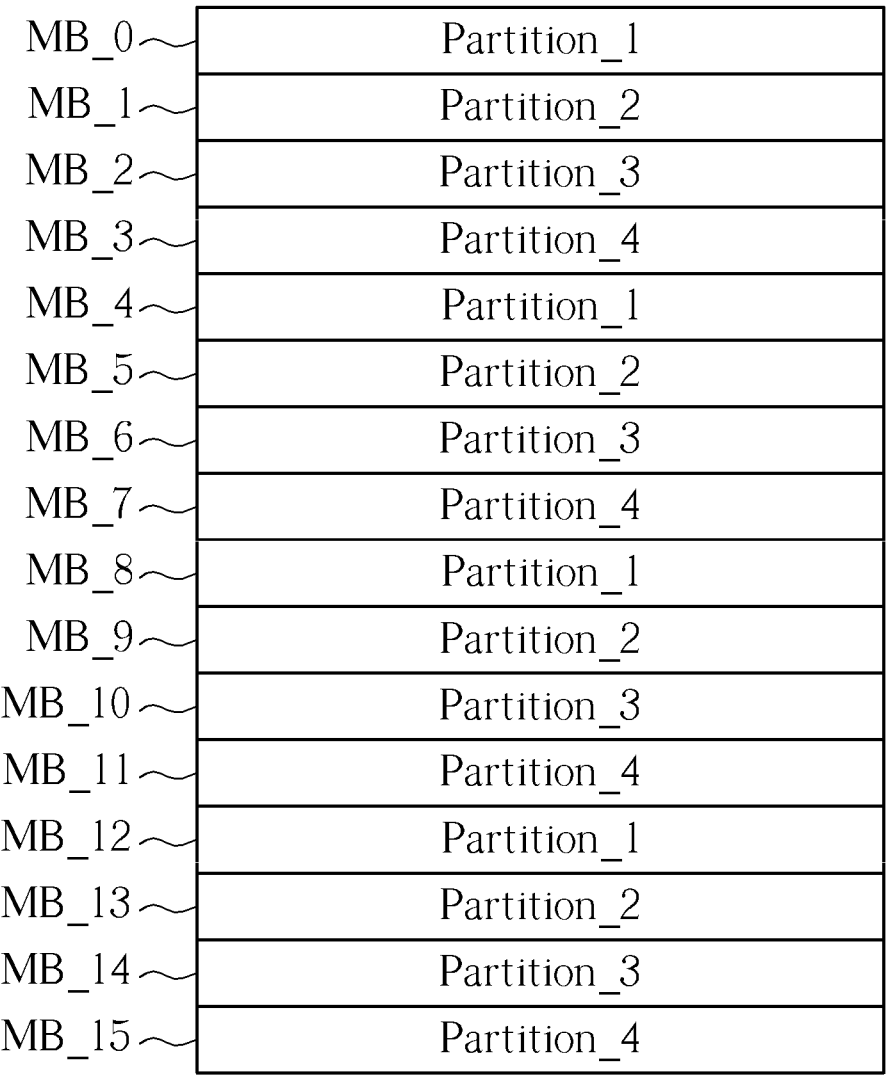
FIG. 2 is a diagram illustrating how transform coefficients in a compressed frame are packed into four partitions.

However, VP8/WebP packs the DCT/WHT coefficients from macroblock (MB) rows into separate partitions. Please refer to FIG. 2, which is a diagram illustrating how transform coefficients in a compressed frame are packed into four partitions. As shown in the figure, there are many MB rows MB_0-MB_15 in the exemplary compressed frame 200. The transform coefficients of the MB rows MB_0, MB_4, MB_8, and MB_12 are packed in a partition Partition_1, the transform coefficients of the MB rows MB_1, MB_5, MB_9, and MB_13 are packed in a partition Partition_2, the transform coefficients of the MB rows MB_2, MB_6, MB_10, and MB_14 are packed in a partition Partition_3, and the transform coefficients of the MB rows MB_3, MB_7, MB_11, and MB_15 are packed in a partition Partition_4. Therefore, as successive MB rows are not packed in the same partition, decoding of one MB may require data read from different partitions. In a case where the employed bitstream buffer does not have enough storage space for buffering data of the whole compressed frame, certain data requested by the decoder may not be immediately available in the bitstream buffer. As a result, the bitstream buffer may have to release the buffered data of one partition and then load the requested data in another partition.

However, switching between different partitions would lower the decoding speed due to the time period needed for loading the requested data. Thus, to improve the efficiency of decoding each compressed frame of a multi-partition VP8/WebP bitstream, the present invention therefore proposes an innovative buffer maintenance and control mechanism. Further details are described as below.

Figure 3:
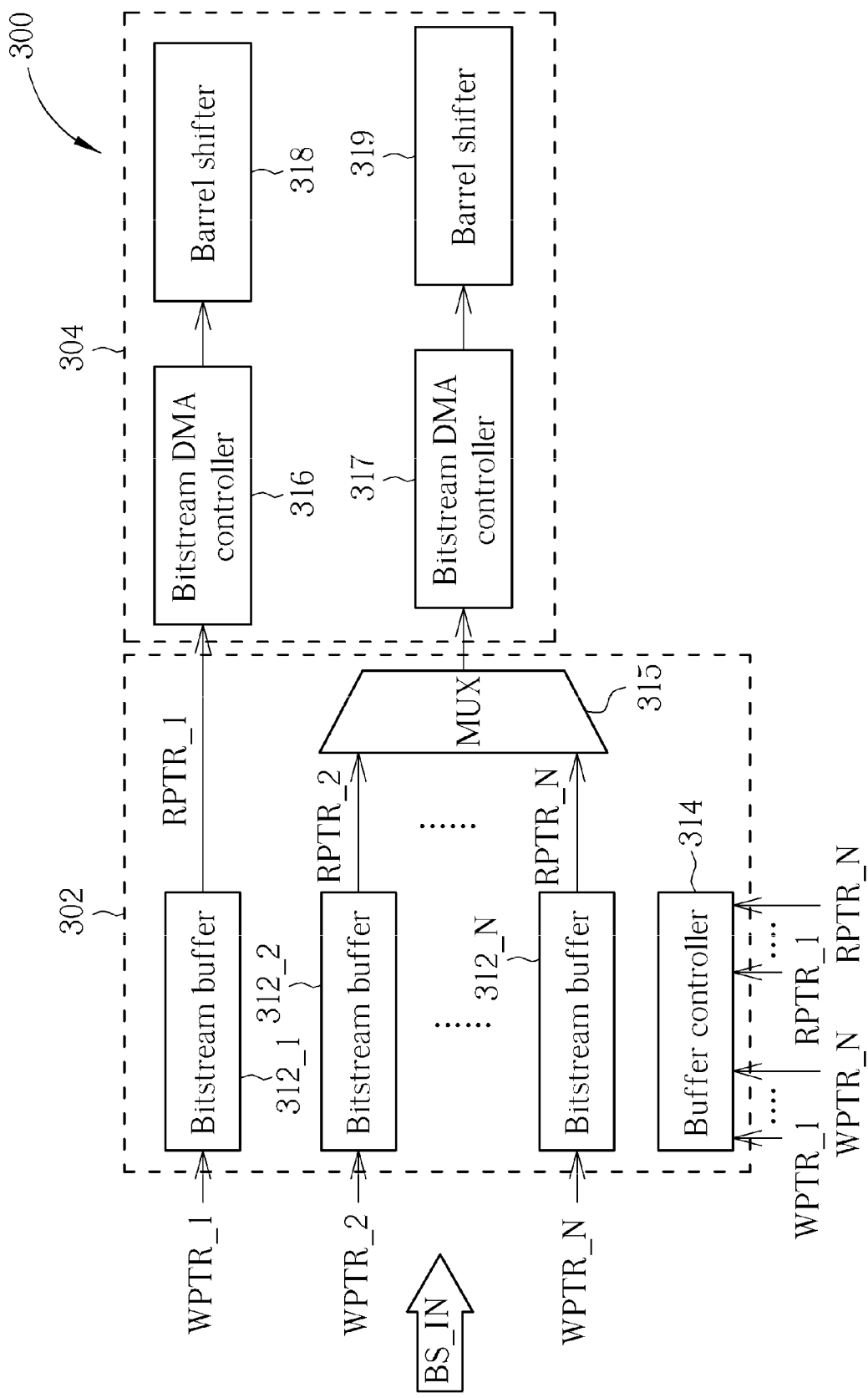
FIG. 3 is a diagram illustrating a video/image decoding system according to a first exemplary embodiment of the present invention.

FIG. 3 is a diagram illustrating a video/image decoding system according to a first exemplary embodiment of the present invention. The video/image decoding system 300 includes a buffering apparatus 302 and a decoding apparatus 304. The buffering apparatus 302 is for buffering a multi-partition video/image bitstream BS_IN which transmits a plurality of compressed frames each having a plurality of partitions. In this exemplary embodiment, the buffering apparatus 302 includes a plurality of bitstream buffers 312_1-312_N, a buffer controller 314, and a multiplexer (MUX) 315. The bitstream buffers 312_1-312_N are arranged to buffer data of the partitions 102_1-102_N shown in FIG. 1, respectively. The bitstream data is stored into the bitstream buffers 312_1-312_N according to write pointers WPTR_1-WPTR_N, and the bitstream data is read from the bitstream buffers 312_1-312_N according to read pointers RPTR_1-RPTR_N. More specifically, the write pointer WPTR_1 controls the write address at which the header information/per-macroblock prediction information is stored into the bitstream buffer 312_1, and the read pointer RPTR_1 controls the read address at which the buffered header information/per-macroblock prediction information of the partition 102_1 is read from the bitstream buffer 312_1; the write pointer WPTR_2 controls the write address at which the transform coefficient (e.g., a DCT/WHT coefficient) of the partition 102_2 is stored into the bitstream buffer 312_2, and the read pointer RPTR_2 controls the read address at which the buffered transform coefficient is read from the bitstream buffer 312_2; and the write pointer WPTR_N controls the write address at which the transform coefficient (e.g., a DCT/WHT coefficient) of the partition 102_N is stored into the bitstream buffer 312_N, and the read pointer RPTR_N controls the read address at which the buffered transform coefficient is read from the bitstream buffer 312_N.

In this exemplary embodiment, the bitstream buffers 312_1-312_N may be continuous/discontinuous ring buffers dedicated to buffering data of the partitions 102_1-102_N, respectively, and data is allowed to be fed into a ring buffer when the ring buffer has free storage space (i.e., the write pointer does not catch up the read pointer yet). In one exemplary design, the buffer controller 314 is arranged to monitor the write pointers WPTR_1-WPTR_N and the read pointers RPTR_1-RPTR_N of all bitstream buffers 312_1-312_N at the same time. Therefore, when the buffer controller 314 detects any bitstream buffer that has free space for receiving more data that is not buffered yet, the buffer controller 314 adjusts the corresponding write pointer and allows data that is not buffered yet to be filled into the bitstream buffer.

In another exemplary design, the buffer controller 314 is arranged to only monitor the write pointer and the read pointer of a currently used bitstream buffer in which the buffered data is being decoded. Therefore, when the buffer controller 314 detects that the currently used bitstream buffer has free space for receiving more data that is not buffered yet, the buffer controller 314 adjusts the corresponding write pointer and allows data that is not buffered yet to be filled into the currently used bitstream buffer.

In above-mentioned exemplary designs, a read pointer and a write pointer of a specific bitstream buffer are used to determine/detect whether the specific bitstream buffer is full or empty or to determine/detect how much free storage space remained in the specific bitstream buffer. However, this is for illustrative purposes only, and is not meant to be a limitation of the present invention. Using other means capable of determining/detecting whether the specific bitstream buffer is full or empty or to determining/detecting how much free storage space remained in the specific bitstream buffer is also feasible.

Regarding the decoding apparatus 304, it includes a plurality of bitstream direct memory access (DMA) controllers 316, 317, and a plurality of barrel shifters 318, 319. The bitstream DMA controller 316 is arranged to transmit buffered bitstream data (i.e., header information/per-macroblock prediction information) from the bitstream buffer 312_1 to the barrel shifter 318 via DMA manner, and the barrel shifter 318 is arranged to parse the bitstream data provided by the preceding bitstream DMA controller 316. The bitstream DMA controller 316 is arranged to transmit buffered bitstream data (i.e., coefficient data) from one of the bitstream buffers 312_2-312_N to the barrel shifter 319 via DMA manner, and the barrel shifter 319 is arranged to parse the bitstream data provided by the preceding bitstream DMA controller 317. Therefore, the decoding apparatus 304 shown in FIG. 3 is capable of decoding two partitions simultaneously.

As only one of the coefficient partitions (i.e., partitions 102_2-102_N) is allowed to be decoded by the decoding apparatus 302, the buffering apparatus 302 therefore uses the multiplexer 315 to select one of the bitstream buffers 312_2-312_N as a data source to be accessed by the bitstream DMA controller 317. For example, when the coefficient data of the partition 102_2 is required to be processed at a first time point, the multiplexer 315 couples the bitstream buffer 312_2 to the bitstream DMA controller 317. However, when the coefficient data of the partition 102_3 is required to be processed at a second time point, the multiplexer 315 couples the bitstream buffer 312_3 to the bitstream DMA controller 317. As the requested coefficient data may be guaranteed to be available in the bitstream buffers (e.g., ring buffers) 312_2-312_N if each of the bitstream buffer 312_2-312_N is properly controlled to buffer data to be decoded when there is free storage space, the buffering apparatus 302 is not required to release buffered data of one partition and load requested data in another partition. To put it another way, the decoding performance may be greatly improved due to the buffering mechanism which employs multiple bitstream buffers dedicated to buffering partial data of respective partitions, thus avoiding frequent releasing of buffered data and loading of requested data.

Please note that the circuit configuration shown in FIG. 3 merely serves as one exemplary embodiment of the present invention. Any alternative design that does not depart from the spirit of the present invention falls within the scope of the present invention. For example, the spirit of the present invention is obeyed as long as the buffering apparatus includes multiple bitstream buffers arranged to buffer data of different partitions in the same compressed frame, respectively. For example, in one alternative design, the buffering apparatus 302 is modified to include the bitstream buffer 312_1 used for buffering bitstream data of the partition 102_1, at least one of the bitstream buffers 312_2-312_N used for buffering at least one of the partitions 102_2-102_N, and a single bitstream buffer used for buffering bitstream data of the rest of the partitions 102_2-102_N. In another alternative design, the buffering apparatus 302 is modified to include at least two of the bitstream buffers 312_2-312_N used for buffering at least two of the partitions 102_2-102_N, and a single bitstream buffer used for buffering bitstream data of the partition 102_1 and bitstream data of the rest of the partitions 102_2-102_N. The objective of improving the decoding performance of the decoding apparatus 304 is also achieved.

The decoding performance of the decoding apparatus 304 may be further improved by utilizing a buffering apparatus with a prefetch mechanism employed therein. Please refer to FIG. 4, which is a diagram illustrating a video/image decoding system according to a second exemplary embodiment of the present invention. The major difference between the video/image decoding systems 300 and 400 is that the buffering apparatus 402 shown in FIG. 4 has a prefetch circuit 404 included therein. In this exemplary embodiment, the prefetch circuit 404 includes a prefetch unit 406 and a storage unit 408. The prefetch unit 406 is arranged to prefetch data from a bitstream buffer in which the coefficient data of a next partition to be processed is stored and store the prefetched data into the storage unit 404 while the decoding apparatus 304 is decoding a current partition, wherein the prefetched data stored in the prefetch unit 408 is read by the decoding apparatus 304 when the decoding apparatus 304 starts decoding the next partition. The storage unit 408 may be an internal buffer of the decoding apparatus 304. Thus, a data access speed of the storage unit 408 could be faster than a data access speed of each of the bitstream buffers 312_2-312_N. For example, the storage unit 408 may be implemented by a register or a static random access memory (SRAM). When the decoding apparatus 304 switches for decoding of the next partition, the time period needed for fetching the coefficient data of the next partition from one of the bitstream buffers 312_2-312_N can be saved/reduced due to the prefetched data available in the storage unit 408. In other words, the time period needed for fetching the coefficient data of the next partition is covered in the time period during which the current partition is decoded. Thus, the use of the prefetch circuit 404 is capable of speeding up the overall decoding process.

Figure 4:
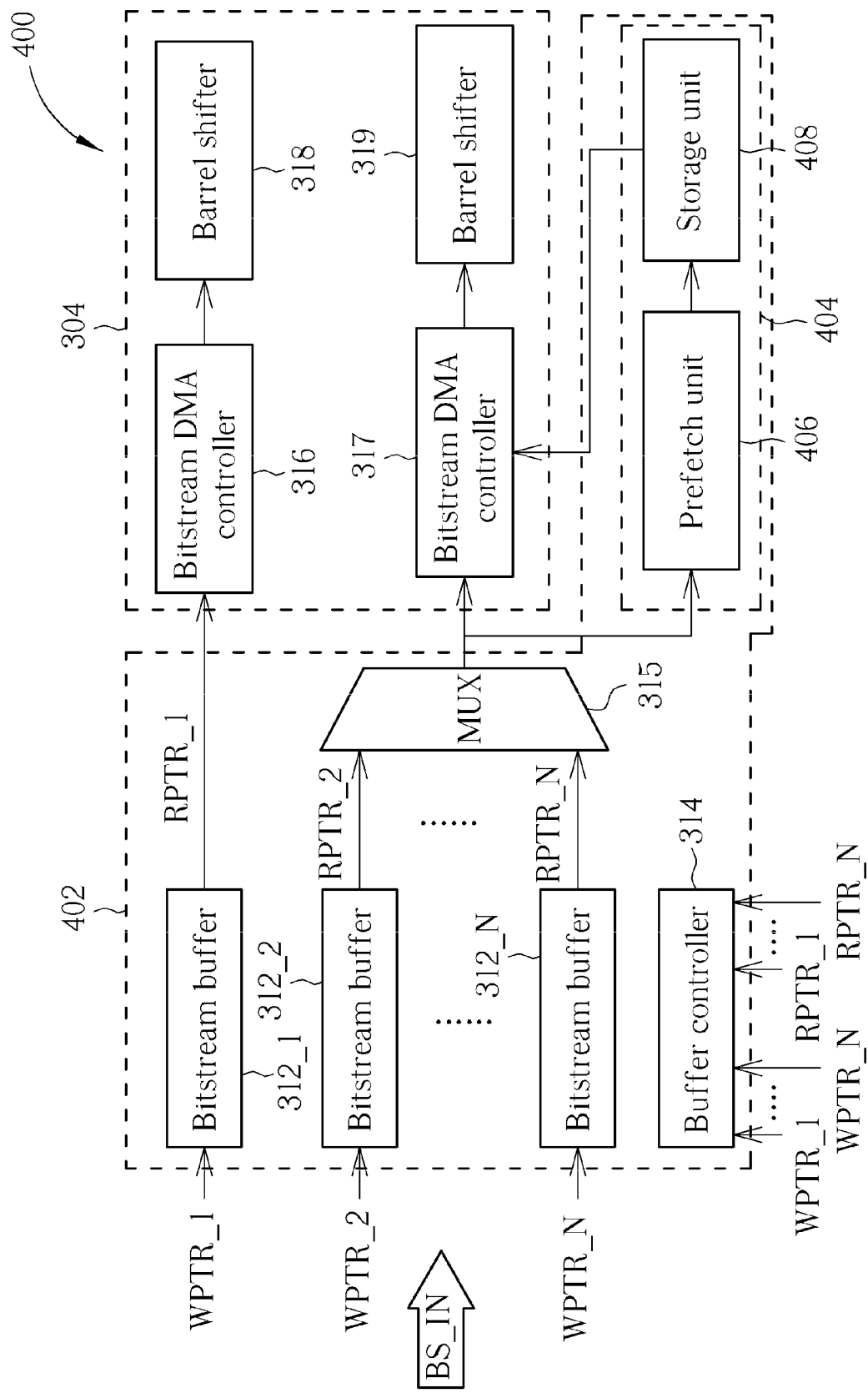
FIG. 4 is a diagram illustrating a video/image decoding system according to a second exemplary embodiment of the present invention.
Figure 5:
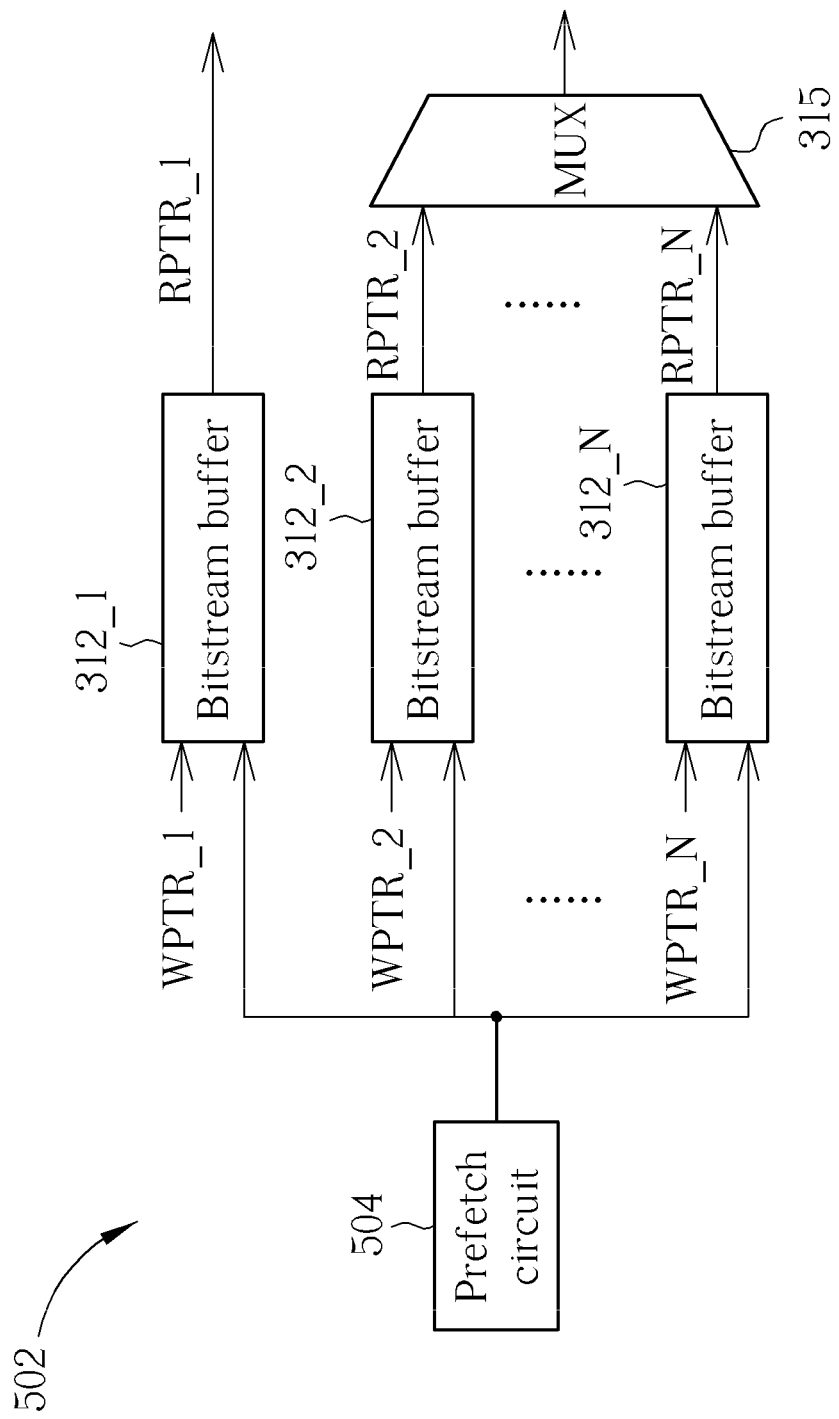
FIG. 5 is a diagram illustrating an alternative design of a buffering apparatus.

In the exemplary embodiment shown in FIG. 4, the prefetch mechanism is employed for prefetching next partition's data to be decoded by the following decoding apparatus. However, the same conception may be applied to prefetching next partition's data to be buffered by one of the bitstream buffers. Please refer to FIG. 5, which is a diagram illustrating an alternative design of the buffering apparatus 302 shown in FIG. 3. The buffering apparatus 502 includes a prefetch circuit 504 and the aforementioned bitstream buffers 312_1-312_N and multiplexer 315. The prefetch circuit 504 is arranged to concurrently monitor one of the bitstreams 312_1-312_N that is buffering coefficient data of a current partition and one or more of the bitstreams 312_1-312_N that are used for buffering coefficient data of next partitions, and requests more data from a previous stage (e.g., Internet, middleware, or disk) when one or more of the bitstreams that are used for buffering coefficient data of next partitions have free storage space available for buffering prefetched data. To put it simply, the prefetch circuit 504 is arrange to prefetch data and store the prefetched data into at least a next partition bitstream buffer while a current partition bitstream buffer is buffering the coefficient data of the current partition processed by the following decoding apparatus. Therefore, with the help of the implemented prefetch mechanism, the bitstream buffering efficiency of the buffering apparatus is improved.

In above exemplary embodiments, the buffering apparatus with the prefetch mechanism employed therein has N bitstream buffers dedicated to buffering data of respective partitions, where N may any positive integer greater than 1. However, the proposed prefetch mechanism may also be employed in a buffering apparatus with a single bitstream buffer used for buffering data of a plurality of partitions.

Figure 6:
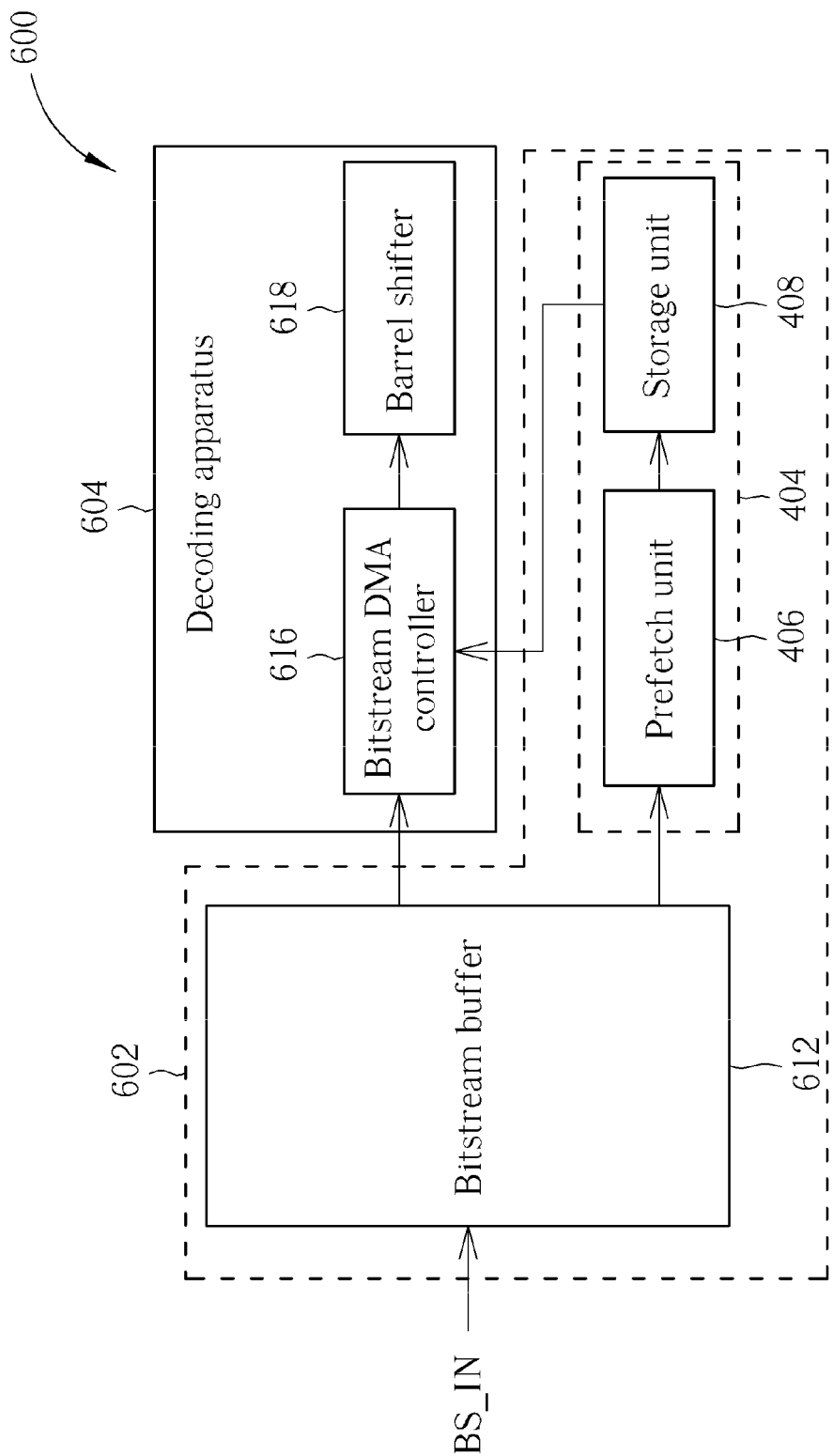
FIG. 6 is a diagram illustrating a video/image decoding system according to a third exemplary embodiment of the present invention.

Please refer to FIG. 6, which is a diagram illustrating a video/image decoding system according to a third exemplary embodiment of the present invention. The video/image decoding system 600 includes a buffering apparatus 602 and a decoding apparatus 604, wherein the buffering apparatus 602 includes a single bitstream buffer 612 and the aforementioned prefetch circuit 404, and the decoding apparatus 604 includes a single bitstream DMA controller 616 and a single barrel shifter 618. In this exemplary embodiment, the single bitstream buffer 612 is not a ring buffer. Besides, the bitstream size of the compressed frame 100 may be large. Thus, in a case where the buffer size of the single bitstream buffer 612 is smaller than the bitstream size of the compressed frame 100, the single bitstream buffer 612 only buffers partial data of the compressed frame 100 (i.e., data of a current partition and next partition(s) of the compressed frame 100). Though the single bitstream buffer 612 may need to switch between partitions for loading requested data from a previous stage (e.g., Internet, middleware, or disk), the use of the prefetch circuit 404 is capable of improving the decoding efficiency of the decoding apparatus 604 by immediately feeding the requested data of the next partition to the decoding apparatus 604 when decoding of the next partition is started.

Moreover, no matter what the buffer size of the single bitstream buffer 612 is (e.g. smaller than/bigger than/equal to the bitstream size of the compressed frame 100), the use of the prefetch circuit 404 is still capable of speeding up the overall decoding process. As a person skilled in the art should readily understand operations of the decoding apparatus 604 and the prefetch circuit 404 after reading above paragraphs, further description is omitted here for brevity.

Figure 7:
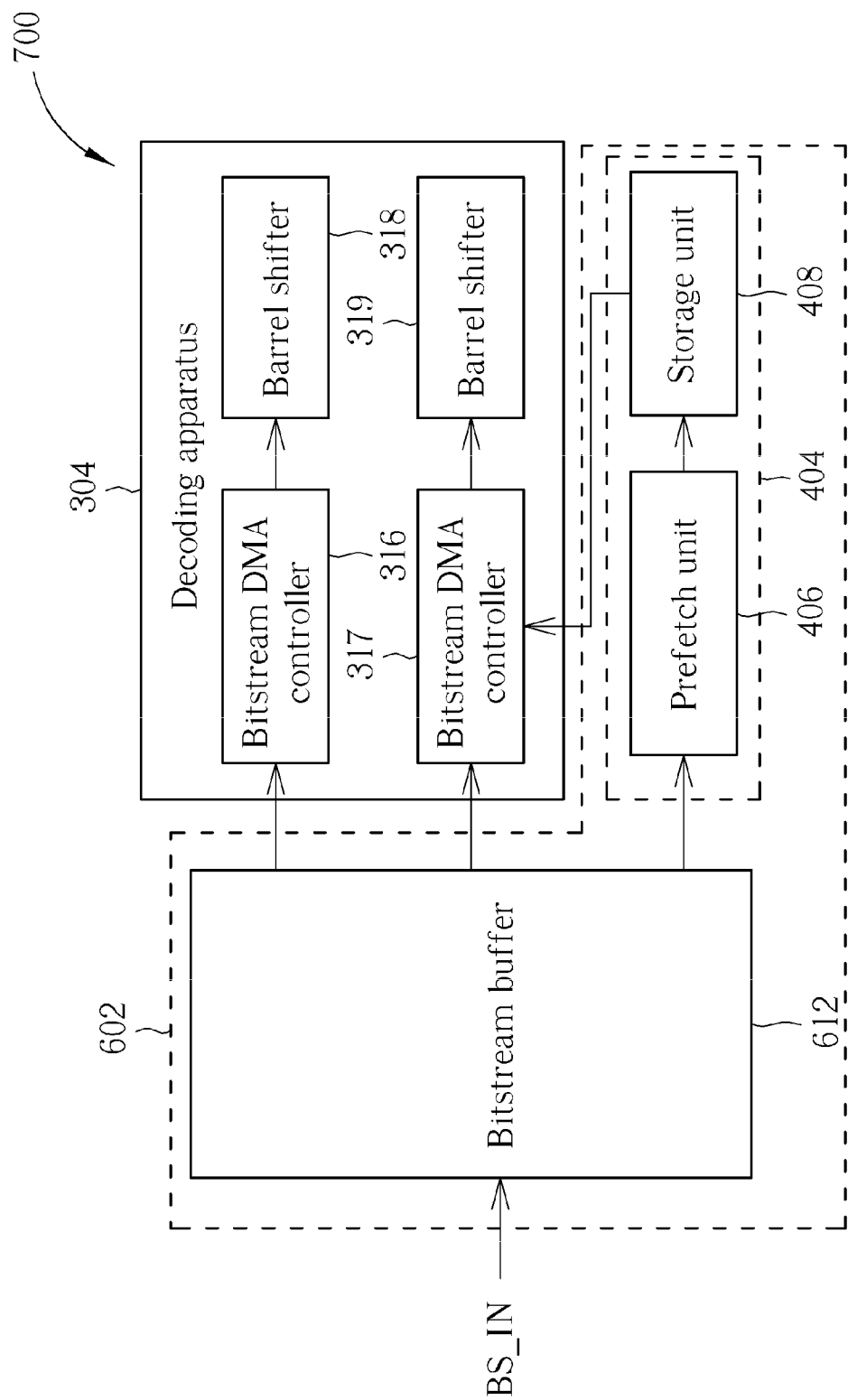
FIG. 7 is a diagram illustrating a video/image decoding system according to a fourth exemplary embodiment of the present invention.

FIG. 7 is a diagram illustrating a video/image decoding system according to a fourth exemplary embodiment of the present invention. The video/image decoding system 700 includes the aforementioned buffering apparatus 602 and decoding apparatus 304. Specifically, the buffering apparatus 602 includes a single bitstream buffer 612 and a prefetch circuit 404, and the decoding apparatus 304 includes a plurality of bitstream DMA controllers 316, 317 and a plurality of barrel shifters 318, 319. Compared to the decoding apparatus 604 shown in FIG. 6, the decoding apparatus 304 shown in FIG. 7 is capable of decoding two partitions simultaneously. The combination of the bitstream DMA controller 316 and barrel shifter 318 is used for processing header information and per-macroblock prediction information contained in the partition 102_1, and the combination of the bitstream DMA controller 317 and barrel shifter 319 is used for processing coefficient data contained in the partitions 102_2-102_N. Similarly, though the single bitstream buffer 612 may need to switch between partitions for loading requested data from a previous stage (e.g., Internet, middleware, or disk), the use of the prefetch circuit 404 is capable of improving the decoding efficiency of the decoding apparatus 304 by immediately feeding the requested data of the next partition to the decoding apparatus 304 when decoding of the next partition is started.

Moreover, no matter what the buffer size of the single bitstream buffer 612 is (e.g. smaller than/bigger than/equal to the bitstream size of the compressed frame 100), the use of the prefetch circuit 404 is still capable of speeding up the overall decoding process. As a person skilled in the art should readily understand operations of the decoding apparatus 604 and the prefetch circuit 404 after reading above paragraphs, further description is omitted here for brevity.

Please note that the above-mentioned exemplary embodiments are directed to buffering and decoding a multi-partition VP8/WebP bitstream. However, this is not meant to be a limitation of the present invention. The proposed buffering mechanism and/or prefetch mechanism may be employed for processing any multi-partition based bitstream.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A buffering apparatus for buffering a multi-partition video/image bitstream which transmits a plurality of compressed frames, each compressed frame comprising a plurality of macroblocks and being divided into a plurality of partitions, the buffering apparatus comprising:
   a first bitstream buffer, arranged to buffer data of a first partition of the partitions of a specific compressed frame;
   a second bitstream buffer, arranged to buffer data of a second partition of the partitions of the specific compressed frame;
   a barrel shifter, coupled to the first bitstream buffer and the second bitstream buffer, for parsing data of the specific compressed frame in order to sequentially decode macroblocks of the bitstream;
   a multiplexer, coupled to the first bitstream buffer, the second bitstream buffer and the barrel shifter, for selectively outputting data of the first partition or data of the second partition; and
   a Direct Memory Access (DMA) controller, coupled between the multiplexer and the barrel shifter, for transmitting the data of the first partition or the data of the second partition to the barrel shifter in a DMA manner;
   wherein the partitions of the specific compressed frame are transmitted individually to the barrel shifter, the first partition and the second partition are two of remaining partitions that are transmitted after a leading partition, and data of a leading partition includes header information applied to the whole specific compressed frame and prediction information for each macroblock in the specific compressed frame.

2. The buffering apparatus of claim 1, wherein the first and second bitstream buffers are ring buffers dedicated to respectively buffering data of the first partition and data of the second partition.

3. The buffering apparatus of claim 1, wherein the data of the first partition includes transform coefficients; and the data of the second partition includes transform coefficients.

4. The buffering apparatus of claim 1, wherein the multi-partition video/image bitstream is a VP8/WebP bitstream.

5. The buffering apparatus of claim 1, wherein the buffering apparatus further comprises:
   a prefetch circuit, arranged to prefetch data and store the prefetched data into the second bitstream buffer while the first bitstream buffer is buffering the data of the first partition.

6. The buffering apparatus of claim 1, further comprising:
   a prefetch circuit, comprising:
      a storage unit; and
      a prefetch unit, arranged to prefetch data from the second bitstream buffer and store the prefetched data into the storage unit while a decoding apparatus is decoding the first partition, wherein the prefetched data stored in the prefetch unit is read by the decoding apparatus when the decoding apparatus starts decoding the second partition.

7. A method for buffering a multi-partition video/image bitstream which transmits a plurality of compressed frames, each compressed frame comprising a plurality of macroblocks and being divided into a plurality of partitions, the method comprising:
  utilizing a first bitstream buffer to buffer data of a first partition of the partitions of a specific compressed frame;
  utilizing a second bitstream buffer to buffer data of a second partition of the partitions of the specific compressed frame;
  utilizing a barrel shifter coupled to the first bitstream buffer and the second bitstream buffer to parse data of the specific compressed frame for sequential decoding of macroblocks of the bitstream;
  utilizing a multiplexer coupled to the first bitstream buffer, the second bitstream buffer and the barrel shifter to selectively output data of the first partition or data of the second partition; and
  utilizing a Direct Memory Access (DMA) controller, coupled between the multiplexer and the barrel shifter, to transmit the data of the first partition or the data of the second partition to the barrel shifter;
  wherein the partitions of the specific compressed frame are transmitted individually to the barrel shifter, the first partition and the second partition are two of remaining partitions that are transmitted after a leading partition, and data of a leading partition includes header information applied to the whole specific compressed frame and prediction information for each macroblock in the specific compressed frame.

8. The method of claim 7, wherein the step of utilizing the first bitstream buffer comprises: utilizing a ring buffer dedicated to buffering data of the first partition as the first bitstream buffer; and the step of utilizing the second bitstream buffer comprises: utilizing a ring buffer dedicated to buffering data of the second partition as the second bitstream buffer.

9. The method of claim 7, wherein the data of the first partition includes transform coefficients; and the data of the second partition includes transform coefficients.

10. The method of claim 7, wherein the multi-partition video/image bitstream is a VP8/WebP bitstream.

11. The method of claim 7, wherein the method further comprises:
  prefetching data and storing the prefetched data into the second bitstream buffer while the first bitstream buffer is buffering the data of the first partition.

12. The method of claim 7, further comprising:
  prefetching data from the second bitstream buffer and buffering the prefetched data while decoding of the first partition is being executed, wherein the buffered prefetched data is read when decoding of the second partition is started.

* * * * *